(12) United States Patent
Kuwahara

(10) Patent No.: US 6,363,255 B1
(45) Date of Patent: Mar. 26, 2002

(54) MOBILE COMMUNICATIONS SYSTEM AND MOBILE STATION THEREFOR

(75) Inventor: Soichi Kuwahara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/411,073

(22) Filed: Oct. 4, 1999

(30) Foreign Application Priority Data

Oct. 26, 1998  (JP) ............................................ 10-303530

(51) Int. Cl.[7] ................................................ H04Q 7/20
(52) U.S. Cl. ...................... 455/456; 455/435; 455/458
(58) Field of Search .............................. 455/422, 423, 455/425, 432, 433, 434, 435, 436, 439, 440, 450, 452, 456–457, 458–464, 517, 519, 525, 459, 67.1, 556, 560, 575; 370/336, 335, 331

(56) References Cited

U.S. PATENT DOCUMENTS

| | | | |
|---|---|---|---|
| 4,876,738 A | * 10/1989 | Selby | 455/435 |
| 5,095,531 A | * 3/1992 | Ito | 455/435 |
| 5,369,681 A | * 11/1994 | Boudreau et al. | 455/456 |
| 5,613,199 A | * 3/1997 | Yahagi | 455/426 |
| 5,634,196 A | * 5/1997 | Alford | 455/18 |
| 5,943,621 A | * 8/1999 | Ho et al. | 455/456 |
| 6,035,203 A | * 3/2000 | Hanson | 455/458 |
| 6,157,833 A | * 12/2000 | Lawson-Jenkins et al. | 455/436 |
| 6,272,334 B1 | * 8/2001 | Rao | 455/418 |
| 6,289,007 B1 | * 9/2001 | Kim et al. | 370/331 |

FOREIGN PATENT DOCUMENTS

| | | |
|---|---|---|
| JP | 3-85828 | 4/1991 |
| JP | 4-220821 | 8/1992 |
| JP | 9-27985 | 1/1997 |
| JP | 9-116952 | 5/1997 |

* cited by examiner

Primary Examiner—Tracy Legree
Assistant Examiner—Jean A Gelin
(74) Attorney, Agent, or Firm—Rosenman & Colin LLP

(57) ABSTRACT

A mobile communications system having a mechanism to reduce the control message traffic in paging and location updating operations. Each mobile station receives from the nearest base station a notification message containing its base station ID. A location change counting unit detects a change in the mobile location by comparing two consecutive instances of the base station ID. It counts and records such location changes, together with the two base station IDs involved in each change. Based on the location change count values, a personal location area (PLA) setting unit defines personal location areas by grouping associated cells into one area. A PLA memory stores the defined personal location areas and relevant base station IDs. Each time a new base station ID is detected, a location change detector tests whether the presently registered personal location area is still valid. If it is no longer valid, a location registration unit searches the PLA memory for a new relevant personal location area. The location registration unit then sends a location updating message to notify the mobile switching center of the new personal location area and its relevant base station IDs.

12 Claims, 16 Drawing Sheets

| BS GROUP | MEMBER BASE STATIONS |
|---|---|
| GROUP #1 | BS1, BS6, BS7, BS12, BS13, BS19 , BS24, BS29, BS33, BS38, |

FIG. 5

| NETWORK DEFAULT LOCATION AREA |
| --- |
| BASE STATION ID |
| MAX. NUMBER OF BASE STATIONS |
| MIN. NUMBER OF BASE STATIONS |
| ⋮ |

FIG. 6

| PERSONAL LOCATION AREA | NUMBER OF MEMBER BASE STATIONS | MEMBER BASE STATIONS |
| --- | --- | --- |
| PLA1 | 3 | BS1, BS6, BS7 |
| PLA2 | 2 | BS12, BS13 |
| PLA3 | 2 | BS19, BS24 |
| PLA4 | 3 | BS29, BS33, BS36 |

FIG. 7

| MOBILE ID | PLA1 | BS1 | BS6 | BS7 |

FIG. 12

| | ACTIVITY PATTERN OF SUBSCRIBER A | | ACTIVITY PATTERN OF SUBSCRIBER B |

- HIGH PRESENCE LEVEL
- ◎ MEDIUM PRESENCE LEVEL
- ○ LOW PRESENCE LEVEL

MOBILE COMMUNICATIONS SYSTEM AND MOBILE STATION THEREFOR

BACKGROUND OF THE INVENTION

1. Field of the Invention

The present invention relates to a mobile communications system and mobile stations therefor. More particularly, the invention relates to a mobile communications system with mobility management functions, including location updating operations, which permit mobile switching centers to keep track of mobile stations roaming between different cells. The invention also to the structure of a mobile station for use in the system.

2. Description of the Related Art

The major components in a typical mobile communications system include: (a) mobile stations, or portable handsets carried by mobile users; (b) a plurality of base stations which support their respective radio service coverage areas, or cells; and (c) a mobile switching center which controls these base stations. When a mobile station places a call to another mobile station, this call request reaches the mobile switching center via a base station nearest to the calling mobile station. The mobile switching center, which tracks the location of every mobile station, sends a paging request message to another base station that is currently serving the called station. The base station transmits this message toward the called mobile station. If a paging response is returned, the system establishes a traffic channel between the calling station and called station, making it possible to transport voice or data signals.

Tasks of keeping track of the location of each mobile station are known as "mobility management," which typically treats several adjacent cells as one unit for management purposes. The areas consolidated as such are called "location areas." FIG. 14 explains the concept of this location area, where smaller circles represent individual cells served by base stations named BS1 to BS40. Larger circles each including seven smaller circles denote location areas defined in this system.

Base stations are designed to transmit the identifier of the location area they belong to, thus allowing mobile stations within the area to recognize which location area they are currently visiting. The mobile stations update their locations by sending a location registration (or location update) message to the mobile switching center, when they move between different location areas. The mobile switching center records this information in its local and remote databases known as the home location register (HLR) and visitor location register (VLR). When there is an incoming call addressed to a specific mobile station, the mobile switching center first identifies the called station's current location area, and then directs all the base stations in that area to transmit a paging request message.

Determining the size of a location area is not a simple task, because there are two conflicting factors that should be balanced. They are: paging message traffic and location update message traffic. If cells are grouped into smaller location areas, the traffic of paging request messages will decrease, because the number of base stations that simultaneously send a paging request message is reduced. However, this also means that mobile stations have to cross the border between location areas more often, thus sending an increased number of location update messages in total. On the other hand, larger location areas will reduce the total number of location updating messages, but instead, increase the paging messages traffic. Therefore, the system designer has to make a compromise between paging message traffic and location update message traffic, so as to reach the optimal location area size.

Another issue concerning location area design is that mobile users have their own activity patterns. They visit different places at different frequencies. For this reason, a specific setup optimized for one user may not always work effectively with another user. Researchers in this technical field have proposed various solutions for this problem as explained below.

One example is the Japanese Patent Application Laid-open Publication No. 8-84364 (1996), regarding a paging system for cellular telephone networks. This patent application proposes a special process to reduce the location updating traffic in such a network where a mobile station frequently moves between two location areas MLA1 and MLA2 shown in FIG. 15. First, the logs of outgoing and incoming calls are used to figure out which cells this mobile station is likely to visit, thereby identifying several frequently-visited cells. Then, the base stations serving those cells are grouped into what is called a "virtual mobile location area (VMLA)." Referring to the example of FIG. 15, the VLMA involves three base stations BS12, BS16, and BS34. The mobile station registers this VLMA as its new location area.

Because the registered location area contains the cells the mobile station often visit, the necessity of location updating will be effectively reduced. About paging operations, the proposed system regards the base stations belonging to VMLA as the primary paging group, the rest of MLA1 as the secondary paging group, and the rest of MLA2 as the tertiary paging group. When a call is placed, the paging operation is attempted first in the primary paging group, then in the secondary group, and lastly in the tertiary group. In this way, the proposed system starts to page the mobile station from its VMLA, which is supposed to be the most likely place. As long as the number of base stations in the VMLA is less than in other areas such as MLA1 and MLA2, the proposed paging system will effectively reduce the amount of paging message traffic.

The above paging system, however, would not work as expected, when the mobile station tends to roam through a wide geographical area, or when each location area has to cover a relatively large number of cells as a result of introduction of microcells. In such situations, a larger VMLA would cause more paging messages to be transmitted. However, this is not to say that the system would work with a smaller VMLA, because the mobile station is less likely to respond to the first attempt of paging in a small area. When the intended mobile station is visiting outside the VMLA, the system is unable to connect with it immediately. This is because the paging process is programmed to start from the VMLA, and thus it takes some time to route the paging request to the right area.

Another solution is proposed in the Japanese Patent Application Laid-open Publication No. 9-116952 (1997), disclosing a mobile communications system. FIG. 16 is a diagram showing this proposed system, where the hatched circles represent the cells visited by a specific subscriber A, and the bold circles show those of another subscriber B. Location areas are defined on the basis of such activity pattern data of each subscriber, and mobile stations in this system are designed not to update their location register unless they leave their respective location areas, thus reducing the location update message traffic.

To describe the above mechanism more specifically, each mobile station measures how long it has been staying in a specific cell, and notifies the mobile switching center of the duration. If the notified duration is longer than a predetermined threshold, the mobile switching center registers the serving base station as a member base station of the location area being developed. When an incoming call to that mobile station is placed, the mobile switching center pages the station through all the member base stations within the location area. As such, the proposed system defines location areas according to each mobile station's mobility pattern to avoid any possible increase in the location updating traffic.

Some active subscribers may visit too many cells to fit in a single location area. If this is the case, the mobile switching center evaluates the duration of their stay in each cell and sorts the relevant cells in descending order of the likelihood of their presence. In the example of FIG. 16, the subscriber A's presence is classified into three levels (and represented by three different symbols) as follows: high level (small black circles), medium level (double circles), and low level (white circles). According to those levels, the cells are grouped into larger areas for paging purposes. When a call to this mobile station is detected, the mobile switching center first directs the high-level group of base stations to page the station. If no paging response is obtained there, it then commands the medium-level group to do the same. If it is still unable to hear the response, the paging request is routed to the low-level group. In this way, the proposed system offers a wide paging area, while taking advantage of the high likelihood of mobile presence. This makes it possible to suppress the paging message traffic, even when the mobile station tends to roam through a wide geographical area.

Mobile stations store all base station IDs relevant to their respective location areas. Suppose that one mobile station is leaving its location area. The mobile station will soon detect the departure by itself, because the base station ID received from the nearest base station does not coincide with any of the base station IDs they have. The mobile station now attempts to register its new location by using an ordinary system of location areas (i.e., those shown in FIG. 14), in order to keep on operating properly.

The above-described mobile communications system works fine as far as the activity of each mobile station is limited within a relatively small geographical region. However, this may not apply to such a subscriber who commutes to his/her distant office. In this case, two isolated location areas will be produced: one around his/her home, and the other around the office. Now, assume that there arises a call to his/her mobile station located in one location area with a lower probability of presence. Paging is attempted, however, in the other location area which is supposed to have a higher probability of presence. This attempt should end up with no response, only wasting time and bandwidth.

Again, the system is designed to combine most likely cells where a specific subscriber is expected to be found at a higher probability. However, it may not always be true that such cells are located closely to each other. With isolated location areas, location registration operations may not be performed efficiently.

SUMMARY OF THE INVENTION

Taking the above into consideration, an object of the present invention is to provide a mobile communications system which effectively suppresses the control message traffic when updating location registers and paging a specific mobile station.

To accomplish the above object, according to the present invention, there is provided a mobile communications system where base stations provide radio links for mobile stations in each cell and a mobile switching center controls connections between the mobile stations by switching circuits. In this system, each mobile station comprises the following element:

(1a) a notification message receiver which receives a notification message from the nearest base station;

(1b) a base station ID extractor which extracts a base station ID from the received notification message to identify which base station is sending the notification message;

(1c) a location change counting unit which detects a change in the mobile location by comparing two consecutive instances of the base station ID extracted by the base station ID extractor, and counts the detected location changes separately for each pair of base station IDs involved in each change;

(1d) a personal location area (PLA) setting unit which defines personal location areas by grouping associated cells into one area, based on the location change count values obtained by the location change counting unit;

(1e) a PLA memory which stores records of the personal location areas defined by the PLA setting unit, each of the records containing the base station IDs indicating which cells constitute each personal location area;

(1f) a location change detector which tests whether the personal location area registered at present is valid, each time the base station ID extracting unit extracts a base station ID that is different from before; and (1g) a location registration unit which is activated when the location change detector has detected that the registered personal location area is no longer valid. It searches the PLA memory to retrieve one of the records of personal location areas that contains the extracted base station ID, and performs location registration by sending to the mobile switching center the retrieved personal location area and its relevant base station IDs.

Further, according to the proposed system, the mobile switching center comprises the following elements:

(2a) a PLA configuration data memory which stores records of the personal location area and relevant base station IDs received from each mobile station; and (2b) a paging unit which searches the PLA configuration data memory, in response to an incoming call to one of the mobile stations, to retrieve one of the records that is relevant to the called mobile station, and pages the called mobile station through the base stations specified in the retrieved record.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is an example of a base station list produced at step S3 in the flowchart of FIG. 4;

FIG. 6 is a diagram which shows a notification message transmitted from base stations to mobile stations in the system of FIG. 1;

FIG. 7 is a diagram showing a list of personal location areas obtained by applying the process of FIG. 4 to the personal location area of FIG. 2:

FIG. 12 is a diagram showing an example of a location update message that the mobile station sends to the mobile switching center when registering its personal location area;

DESCRIPTION OF THE PREFERRED EMBODIMENTS

Preferred embodiments of the present invention will be described below with reference to accompanying drawings.

Figure 1:
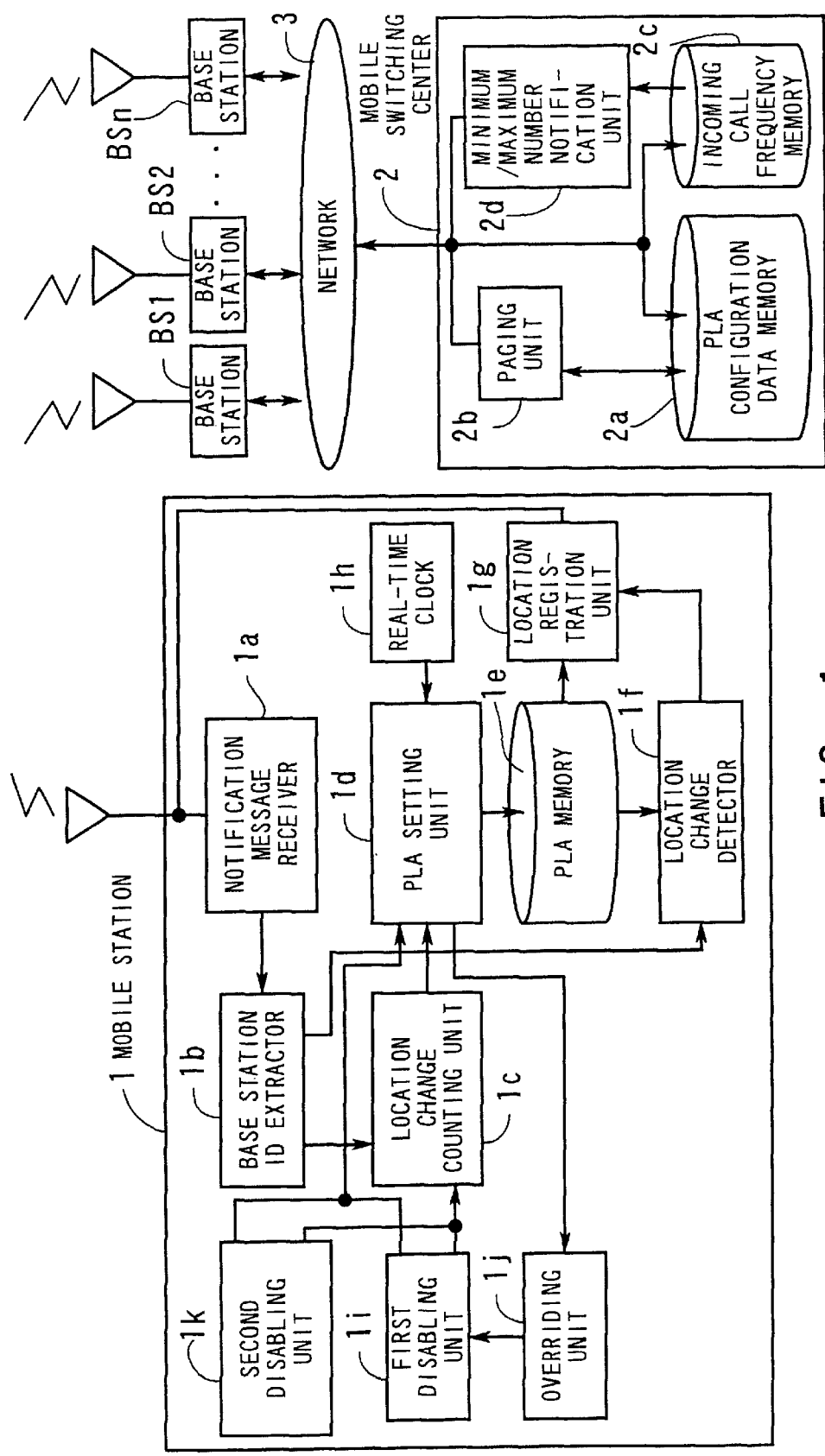
FIG. 1 is a block diagram of a mobile communications system according to an embodiment of the present invention.

FIG. 1 is a block diagram of a mobile communications system according to the present invention. Broadly, this system comprises a mobile station 1, a mobile switching center 2, a network 3, and base stations 4-1 to 4-n. The mobile station 1 comprises the following elements: a notification message receiver 1a, a base station ID extractor 1b, a location change counter 1c, a PLA setting unit 1d, a PLA memory 1e, a location change detector 1f, a location registration unit 1g, a real-time clock 1h, a first disabling unit 1i, an overriding unit 1j, and a second disabling unit 1k. Those elements provide the functions described below.

The notification message receiver 1a receives notification messages from the nearest base station, which include, for example, a base stations ID to identify the sending base station. The base station ID extractor 1b extracts this base station ID from the received notification message. The location change counting unit 1c detects a change in the mobile location by comparing two consecutive instances of the base station ID extracted by the base station ID extractor 1b. When the base station ID received this time is not identical with the previous one, the location change counting unit 1c stores a record of the two base station IDs, as well as counting this event.

Based on the above data accumulated by the location change counting unit 1c, the PLA setting unit 1d defines personal location areas (PLAs) by dividing the cells of the base stations 4-1 to 4-n into appropriate groups. The PLA memory 1e stores the resultant personal location areas, together with their associated base station IDs.

The location change detector 1f keeps track of the base station IDs detected by the base station ID extractor 1b to check the validity of the personal location area that is registered at present. That is, each time a new base station ID is detected, it tests whether the mobile station 1 has left the present personal location area. If this test has revealed that the current location registration is no longer valid, the location registration unit 1g searches the PLA memory 1e to find a new personal location area that includes the new base station as its member. It then informs the mobile switching center 2 of the new personal location area, thereby updating the mobile location.

The real-time clock 1h provides date and time information to the PLA setting unit 1d and other elements of the mobile station 1. The first disabling unit 1i stops the operation of the location change counting unit 1c and PLA setting unit 1d to reduce workloads and save energy. The overriding unit 1 temporarily enables the operation to resume even when the first disabling unit 1i is active. This gives the mobile station 1 an opportunity to review the validity of the present definition of personal location areas. If the personal location areas obtained during this period do not agree with those used at present, this indicates that the present setup has lost validity. If this is the case, the overriding unit 1j further overrides the first disabling unit 1i for a predetermined extended period, allowing the personal location areas to be refreshed. The second disabling unit 1k stops the location change counting unit 1c and PLA setting unit 1d when the mobile station 1 is roaming. Here, the term "roaming" denotes that the mobile station has left its home location and is visiting a remote cell.

On the other hand, the mobile switching center 2 comprises the following elements: a PLA configuration data memory 2a, a paging unit 2b, an incoming call frequency memory 2c, and a minimum/maximum number notification unit 2d. These elements are designed to operate as follows.

The PLA configuration data memory 2a stores personal location areas defined by, and informed from, each mobile station 1, together with their associated base station IDs. The paging unit 2b pages mobile stations when they are called. That is, when there is an incoming call addressed to a particular mobile station, the paging unit 2b searches the PLA configuration data memory 2a to obtain relevant base station IDs and sends a paging request message through the base stations identified by those IDs.

The incoming call frequency memory 2c stores records of how many incoming calls each mobile station has received. It provides the minimum/maximum number notification unit 2d with such records, if requested. The minimum/maximum number notification unit 2d notifies the mobile station 1 of the minimum number and maximum number of cells to be grouped into one personal location area. Those minimum and maximum numbers, which actually limit the size of personal location areas, are determined by the mobile switching center 2 so as to optimize the system performance. If appropriate, the minimum/maximum number notification unit 2d changes those parameters, referring to the records of incoming calls stored in the incoming call frequency memory 2c, and notifies the mobile station 1 of the new parameter values. (The above maximum and minimum numbers will appear in a later section as the maximum allowable number of base stations and minimum required number of base stations, respectively. Note that, in the present context, the number of cells is equivalent to the number of base stations.)

Figure 2:
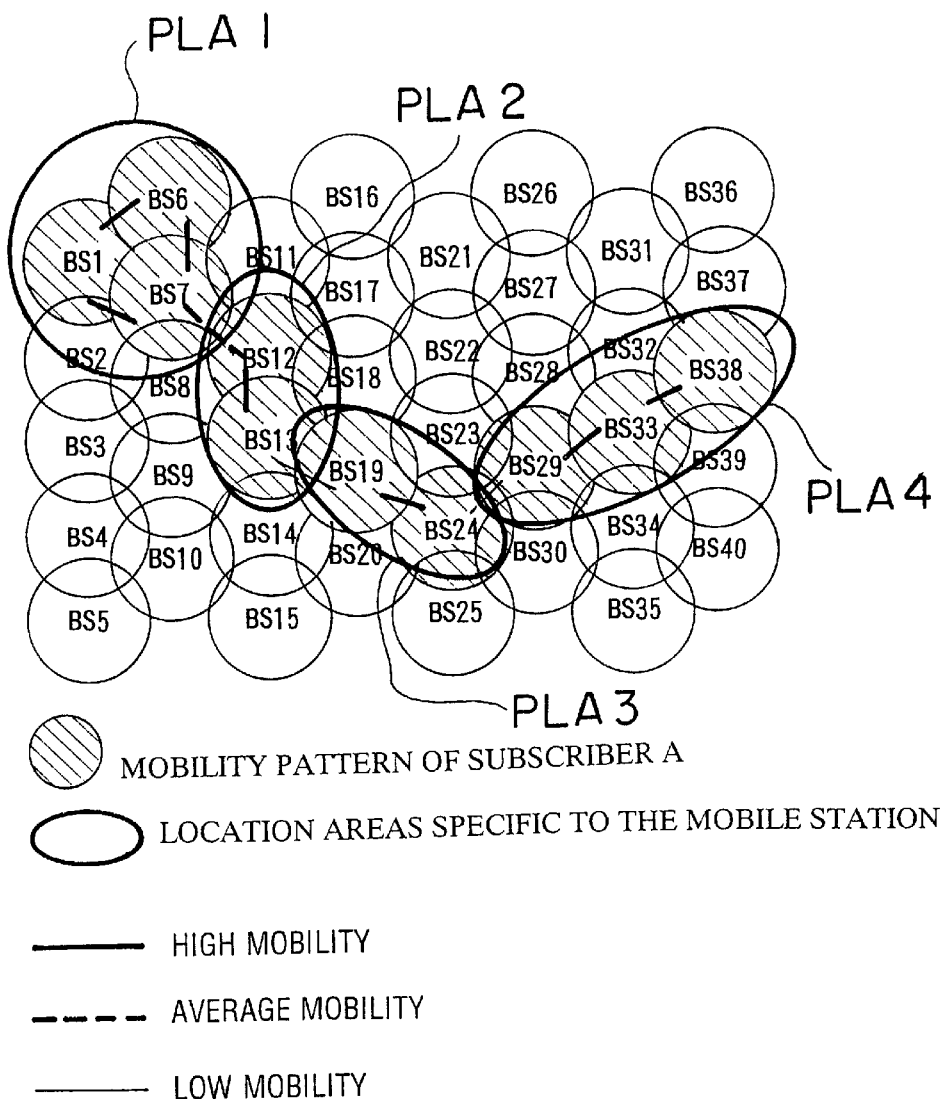
FIG. 2 is a diagram which illustrates personal location areas defined by a mobile station in the system of FIG. 1.

The next section will now describe how the system operates in the above-described embodiment of the present invention. For illustrative purposes, it is assumed that there is a service coverage area comprising forty cells as indicated by small circles in FIG. 2. These cells are supported by base stations BS1 to BS40 under the control of the mobile switching center 2 (FIG. 1). Some cells in FIG. 2 are hatched with slant lines, indicating that they are visited relatively frequently by subscriber A, the user of the mobile station 1 (FIG. 1).

Consider, for example, that the mobile station 1 is located in the cell that the base station BS1 serves. The base station BS1 transmits its own base station ID in a notification message, which is received by the notification message receiver 1a of the mobile station 1. The base station ID extractor 1b extracts this base station ID from the received notification message and supplies it to the location change counting unit 1c. Each time a different base station ID is received from the base station ID extractor 1b (that is, each time the mobile station 1 enters a different cell), the location change counting unit 1c increments a corresponding item of its internal location change counting table as will be described below.

Figure 3:
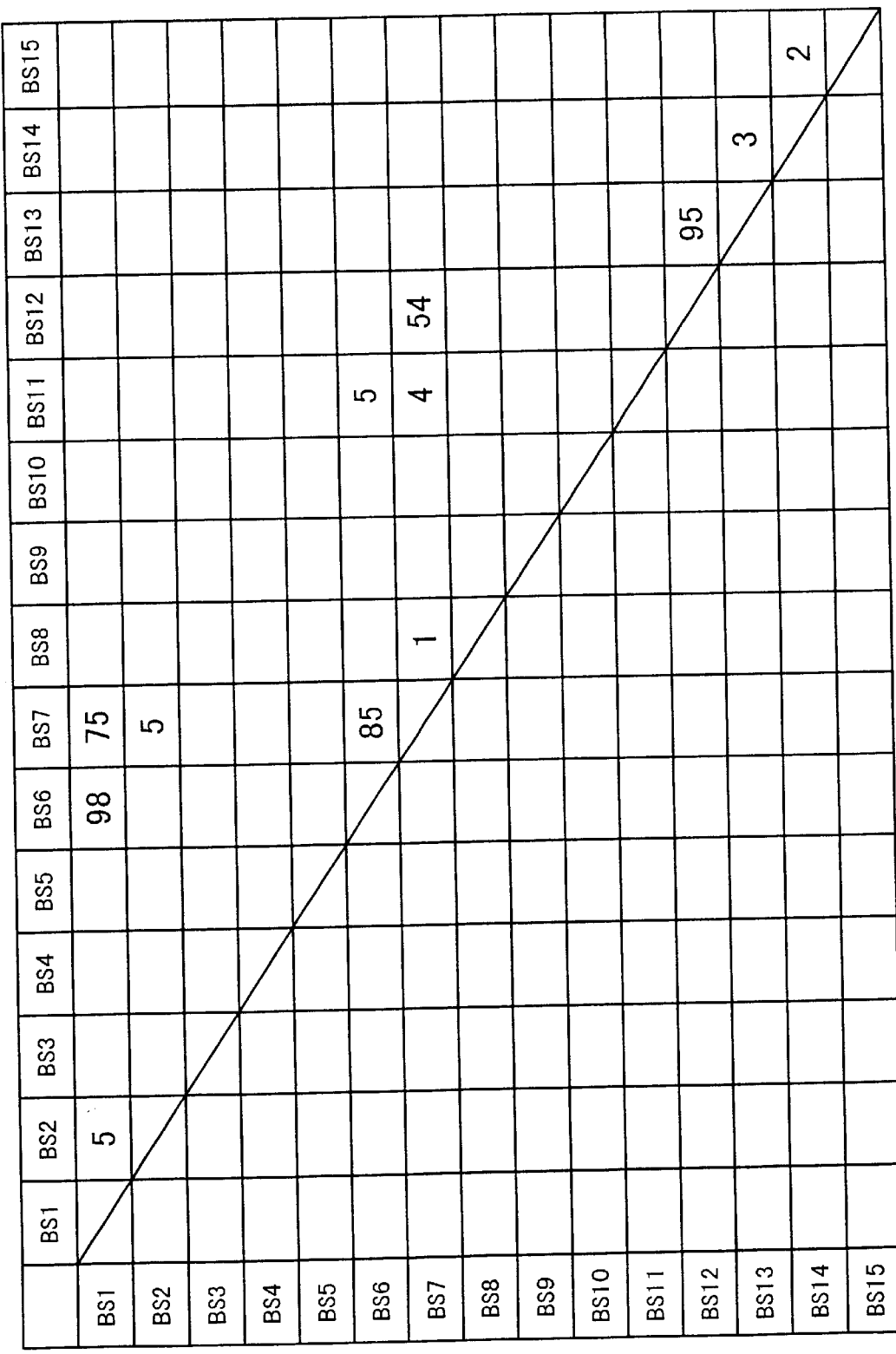
FIG. 3 is a diagram which shows a typical location change counting table created in the mobile station.

FIG. 3 shows the structure of the location change counting table, which lists all available pairs of adjacent base stations in matrix form. Each element of this matrix indicates how many times the mobile station 1 has changed its location from one particular cell to another particular cell. Note that the lower left half of this table is left blank because the direction of movements is disregarded. Because of space limitation, FIG. 3 is unable to show the table in its entirety, but only presents BS1 to BS15 out of forty base stations. Take the element at the upper left corner of this table for example. This element indicates that five transitions from BS1 to BS2, or BS2 to BS1, were observed, meaning that the mobile station 1 moved five times from the cell of BS1 to that of BS2, or vice versa.

The location change counting table will grow up to a statistically meaningful level, after such events are accumulated for a predetermined period (e.g., one month). The mobile station 1 now executes a process to define its personal location areas according to a flowchart of FIG. 4. This process comprises the following steps.

(S1) The location change counting unit 1c normalizes the data in the location change counting table of FIG. 2. More specifically, it first extracts a maximum value from the table and then divides all the items by this maximum value. This operation will make all the count values in the table fall within the range of zero to one, hence normalizes the table data.

(S2) The location change counting unit 1c scans the normalized table to pick up such location change count values that exceed a predetermined threshold (e.g., 0.1).

(S3) The PLA setting unit 1d extracts base station IDs relevant to the location change count values picked up at step S2, thereby creating a list of base stations. In the present example of FIG. 2, the list includes the following base stations: BS1, BS6, BS7, BS12, BS13, BS19, BS24, BS29, BS33, and BS38. This step S3 results in a base station group shown in FIG. 5.

(S4) The PLA setting unit 1d initializes a variable i to one.

(S5) The PLA setting unit 1d extracts a base station pair (BSj, BSk) corresponding to the i-th largest location change count. Here, the expression (BSJ, BSk) refers to a pair of base stations (or base station IDs, more precisely) BSJ and BSk, which the mobile station 1 may move from one to the other. According to the table of FIG. 3, the base station pair (BS1, BS6) exhibits the largest count, namely 98. The PLA setting unit 1d thus chooses this pair (BS1, BS6) in the first iterative cycle, where i=1.

(S6) The PLA setting unit 1d tests whether either one of the two base stations (BSJ, BSk) extracted at step S5 has already been registered in a PLA table. This PLA table is a table held in the PLA memory 1e to store the definition of personal location areas created through the present process. If either one is found in the PLA table, the process advances to step S7. If neither of them is found, it proceeds to step S8.

(S7) The PLA setting unit 1d calls a "Merge" routine to combine the extracted base station pair (BSj, BSk) with the relevant PLA entry by using their common base station ID as a key. The full details of this merging process will be explained later, with reference to a dedicated flowchart.

(S8) The PLA setting unit 1d registers the base station pair (BSJ, BSk) as a new entry to the PLA table in the PLA memory 1e.

(S9) The PLA setting unit 1d determines whether any unprocessed base station pairs still exist. If any such pairs are found, the process proceeds to step S10. If all the pairs are finished, the process advances to step S11.

(S10) The PLA setting unit 1d increments the variable i by one. The process then returns to step S5.

(S11) The PLA setting unit 1d extracts such an entry of the PLA table that has not reached the minimum number of base stations. Here, the minimum number of base stations is one of the parameters given by the mobile switching center 2, which actually means the minimum required number of cells that each personal location area must include. The minimum/maximum number notification unit 2d supplies this parameter to the base stations BS1 to BSn, which then distribute it in a notification message addressed to mobile stations in their respective cells. As FIG. 6 shows, the notification message conveys the following information: network default location area ID provided by the system, base station ID of the sending base station, maximum number of base stations to be grouped, minimum number of base stations to be grouped, and so on.

(S12) The PLA setting unit 1d reinitializes the variable i to one.

(S13) The PLA setting unit 1d searches the location change counting table (FIG. 3) for a base station pair that exhibits the i-th largest count value. If the retrieved pair is related to the PLA entry of interest, the PLA setting unit 1d then merges the pair with the PLA entry. More specifically, if either one of the retrieved base station pair is found in the PLA entry as its member base station, the other one of the pair will be added to the PLA entry as a new member.

(S14) The PLA setting unit 1d determines whether the member base stations registered in the PLA entry of interest has reached the minimum required number of base stations. If the PLA entry satisfies this condition, the process advances to step S16, and otherwise, the process proceeds to step S15.

(S15) The PLA setting unit 1d increments the varible i by one. The process then returns to step S13.

(S16) The PLA setting unit 1d tests whether all the entries in the PLA table satisfy the requirement in terms of the minimum number of base stations. If they satisfy the requirement, the process terminates. Otherwise, the process returns to step S11 for the next iteration.

FIG. 7 shows a list of personal location areas which result from the above process when it is applied to the mobility pattern shown in FIG. 2. The list contains four such areas PLA1 to PLA4, which are represented by bold circles in FIG. 2. Take the first personal location area PLA1 for example. This PLA1 involves three registered base stations, BS1, BS6, and BS7, which govern adjacent three cells. FIG. 2 also shows different mobility levels by three kinds of line symbols. First, the bold solid line segments each connecting two specific cells indicate a high mobility, meaning that the mobile station 1 moves from one cell to the other relatively often (i.e., frequent handoff operations would occur between those two base stations). Then the broken bold line segments denote an average mobility, and the thin line segments a low mobility.

Figure 8:
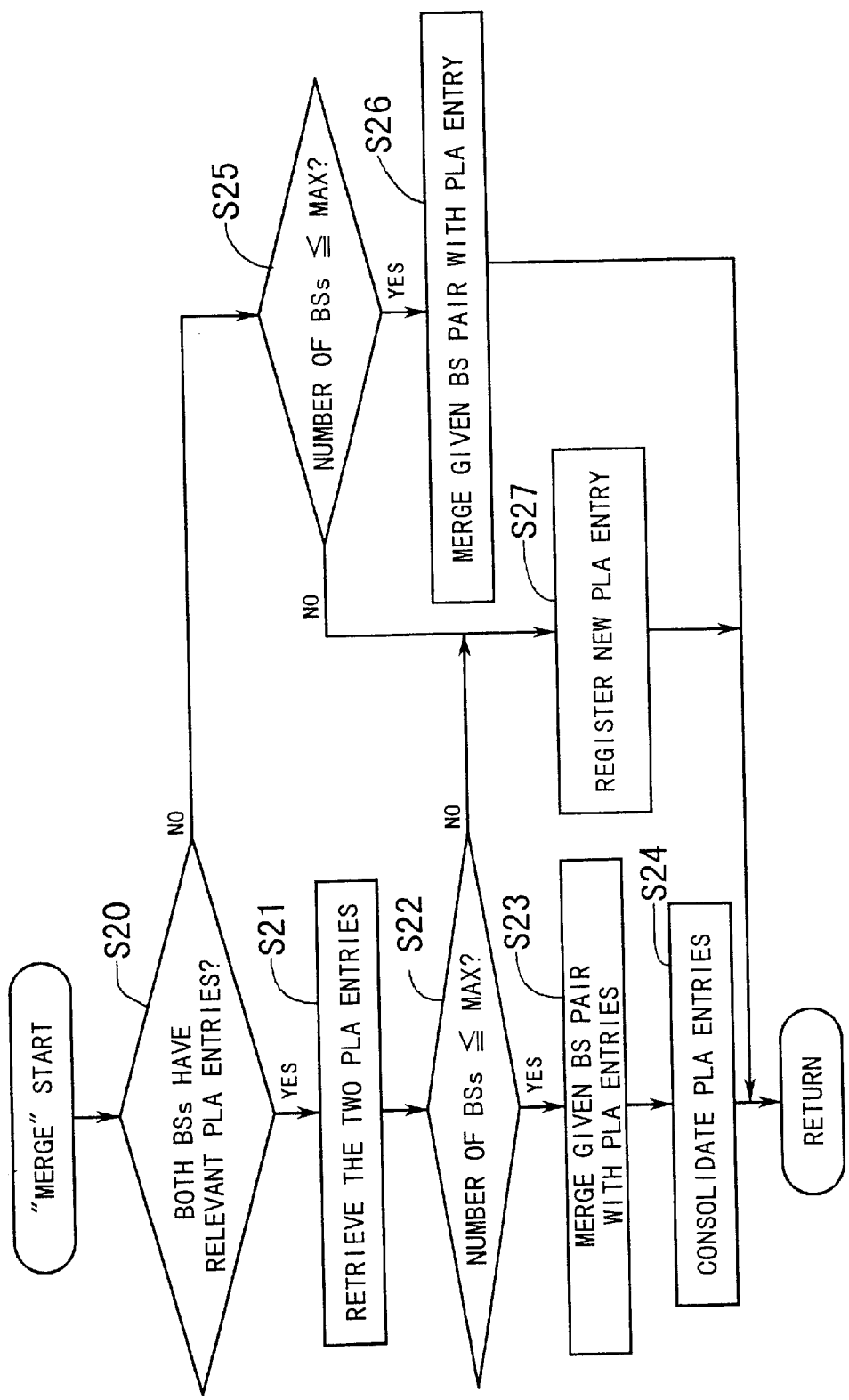
FIG. 8 is a flowchart which shows the details of "MERGE" routine called at step S7 in the flowchart of FIG. 4.

Referring next to FIG. 8, the details of the "Merge" routine, which appeared at step S7 in the flowchart of FIG. 4, will be explained below. This routine comprises the following steps. Note that a specific base station pair (BS, BSk) extracted at step S5 is passed to this routine as an argument.

(S20) The PLA setting unit 1d tests whether the PLA table has two different entries that include the given base station IDs, BSj and BSk, respectively. If this test reveals that there exist two such entries, the process advances to step S21. If there is only one such entry, it proceeds to step S25.

Suppose, for instance, that a specific base station pair (BS1, BS2) was extracted at step S5, while the present entries of the PLA table include (BS1, BS4) and (BS2, BS5). Then the process would proceed to step S21, because one element BS1 of the pair is common to the former PLA entry (BS1, BS4), and the other element BS2 is common to the latter PLA entry (BS2, BS5).

(S21) The PLA setting unit 1d retrieves those two entries from the PLA table. In the above example, the entries (BS1, BS4) and (BS2, BS5) are retrieved.

(S22) The PLA setting unit 1d then calculates the number of base stations included in either the base station pair extracted at step S5 or the entries retrieved at step S21. Note that any duplicated instances should be rejected from the sum total. It then compares the total number of base stations with a given parameter, the maximum number of base stations. If the calculated total number is not greater than this parameter, the process advances to step S23. Otherwise, it goes to step S27.

The maximum number of base stations denotes the number of cells that can be grouped into one personal location area. In other words, it sets an upper limit on the size of a personal location area. The minimum/maximum number notification unit 2d supplies this parameter to the base stations BS1 to BSn, which then distribute it to mobile stations in their respective cells, in the form of a notification message shown in FIG. 6. In the present example, the two PLA entries and extracted base station pair involve four base stations in total. When the maximum number of base stations is set to four or more, the process will proceed to step S23.

(S23) The PLA setting unit 1d merges the given base station pair with the two entries retrieved at step S21. In the present example, the given base station pair (BS1, BS2) and the two entries (BS1, BS4) and (BS2, BS5) are merged into one group, thus yielding a new expanded entry (BS1, BS2, BS4, BS5).

(S24) The PLA setting unit 1d replaces one of the two entries retrieved at step S21 with the new entry and deletes the other entry, thereby consolidating the two entries into one. In the present example, the newly produced entry (BS1, BS2, BS4, BS5) is stored into a memory space where the old entry (BS1, BS4) was held, and the other old entry (BS2, BS5) is removed from the PLA table.

(S25) The PLA setting unit 1d calculates the number of base stations included in either of the base station pair and entry in process. Note again that any duplicated instances should be rejected from the sum total. It then compares the total number of base stations with the maximum number of base stations. If the calculated total number is not greater than the maximum number, the process advances to step S26, and otherwise, it goes to step S27.

Suppose, for instance, that the present entries of the PLA table include only one relevant entry (BS1, BS4) to the base station pair of interest. Since the test at step S20 fails, the process proceeds to step S25, where the total number of base stations is compared with the maximum allowable number. In the present example, the base station pair and its relevant PLA entry involve three base stations in total. If the maximum allowable number of base stations is set to three or more, the process will proceed to step S26.

(S26) The PLA setting unit 1d merges the given base station pair with the PLA entry of interest. In the present example, a new entry (BS1, BS2, BS4) is created from the given base station pair and its relevant PLA entry, and the PLA table is updated by replacing the existing entry (BS1, BS4) with the newly created entry.

(S27) The PLA setting unit 1d registers the given base station pair (BSj, BSk) to the PLA table as a new entry. This step is executed when step S22 or S26 has revealed that the total number of base stations would exceed the maximum allowable number if a merge was performed.

Figure 9:
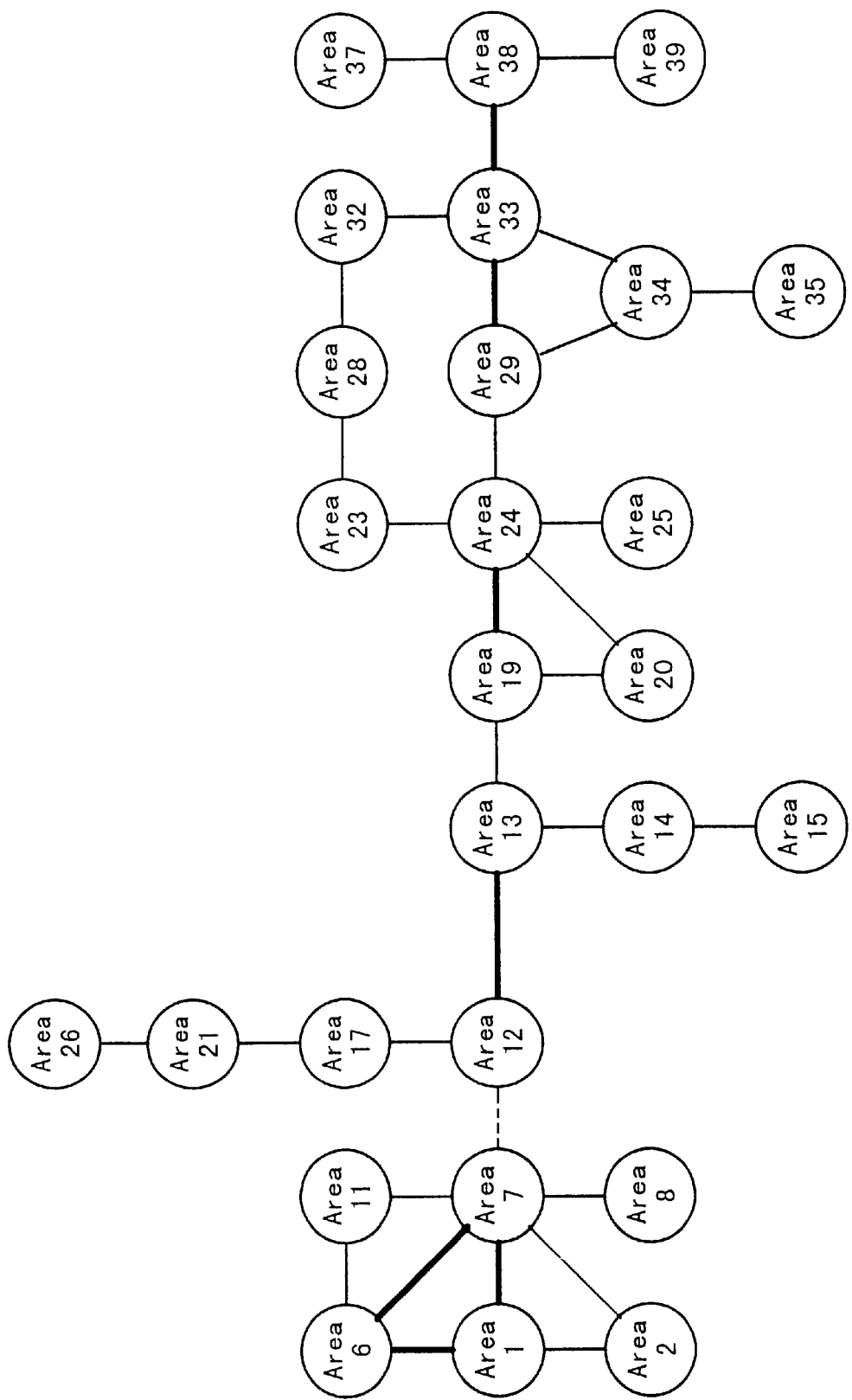
FIG. 9 is a diagram which shows the cells visited by the mobile station.

The above-described processes yield several personal location areas, reflecting the past behavior of a mobile user. FIG. 9 shows an example of a mobility pattern of the mobile station 1, in which small circles represent the cells that the user has visited in the past, and line segments interconnecting them indicate different mobility levels. That is, the bold solid line segments denote that the mobile station 1 moves between the two cells relatively often. The bold broken line segments indicate average frequencies, and the thin line segments represent relatively infrequent movement. In this example, the above-described process forms a personal location area from, for example, cells #1, #6, and #7, since those cells exhibit relatively high levels of user movement.

If necessary, the user of the mobile station 1 can stop the operation of the base station ID extractor 1b and PLA setting unit 1d by activating the first disabling unit 1i to keep the current setting of personal location areas. This feature may be useful when, for example, the owner of the mobile station 1 lends his/her handset to another person. Notice that the definition of the personal location areas are optimized for the owner's mobility pattern. The first disabling unit ii will permit him/her to protect that valuable data from being altered.

In addition to the above usage of the first disabling unit 1i, it is also possible to configure the mobile station 1 to activate the first disabling unit 1i automatically, each time a complete set of personal location areas is established (i.e., after the expiration of a one-month monitoring period). This option is based on such an assumption that the user's mobility pattern is likely to be stable and there would thus be no immediate need to update the setup. By disabling the PLA setting unit 1d and related functions, the mobile station 1 reduces its processing load and power consumption.

As an additional feature of the proposed mobile station 1, the overriding unit 1j suppresses the above functions of the first disabling unit 1i temporarily, allowing a new set of personal location areas to be obtained intermittently for validity checking purposes. The PLA setting unit 1d compares the newly obtained personal location areas with those registered in the PLA memory 1e, and if they exhibit substantial variations enough to invalidate the current setup, it then refreshes the PLA entries with the new ones. This feature permits the mobile station 1 to maintain the validity of personal location areas, tracking possible variations in the user's mobility pattern.

Meanwhile, recall that the maximum and minimum numbers of base stations are specified by the mobile switching center 2 and delivered as part of the notification message (FIG. 6) sent from the nearest base station. These parameters are actually determined on the basis of statistics about how often the mobile station receives incoming calls. As mentioned earlier, the frequency of incoming calls to each mobile station is monitored by the mobile switching center 2 and is recorded in its incoming call frequency memory 2c. These records are used to extract two particular groups of mobile stations: frequently-called stations and infrequently-called stations. Where appropriate, the minimum/maximum number notification unit 2d assigns smaller numbers to the maximum and minimum numbers of base stations for use by frequently-called stations, thereby reducing the size of each personal location area they will create. For infrequently-called mobile stations, on the other hand, it assigns larger numbers to those two parameters, allowing them to create larger personal location areas.

The above system provides the following benefit. First, it is possible to suppress the expected increase in paging message traffic by narrowing down the personal location areas of frequently-called mobile stations. Also, it is possible to suppress the location registration message traffic by enlarging the personal location areas of infrequently-called mobile stations.

Further, as a variation of the above-described mechanism, the mobile station 1 may record for itself how many times it has been paged, instead of counting the calls at the mobile switching center 2. In this case, the mobile station 1 may, if needed, modify the maximum and minimum numbers of base stations after receiving them as part a notification message.

Figure 10:
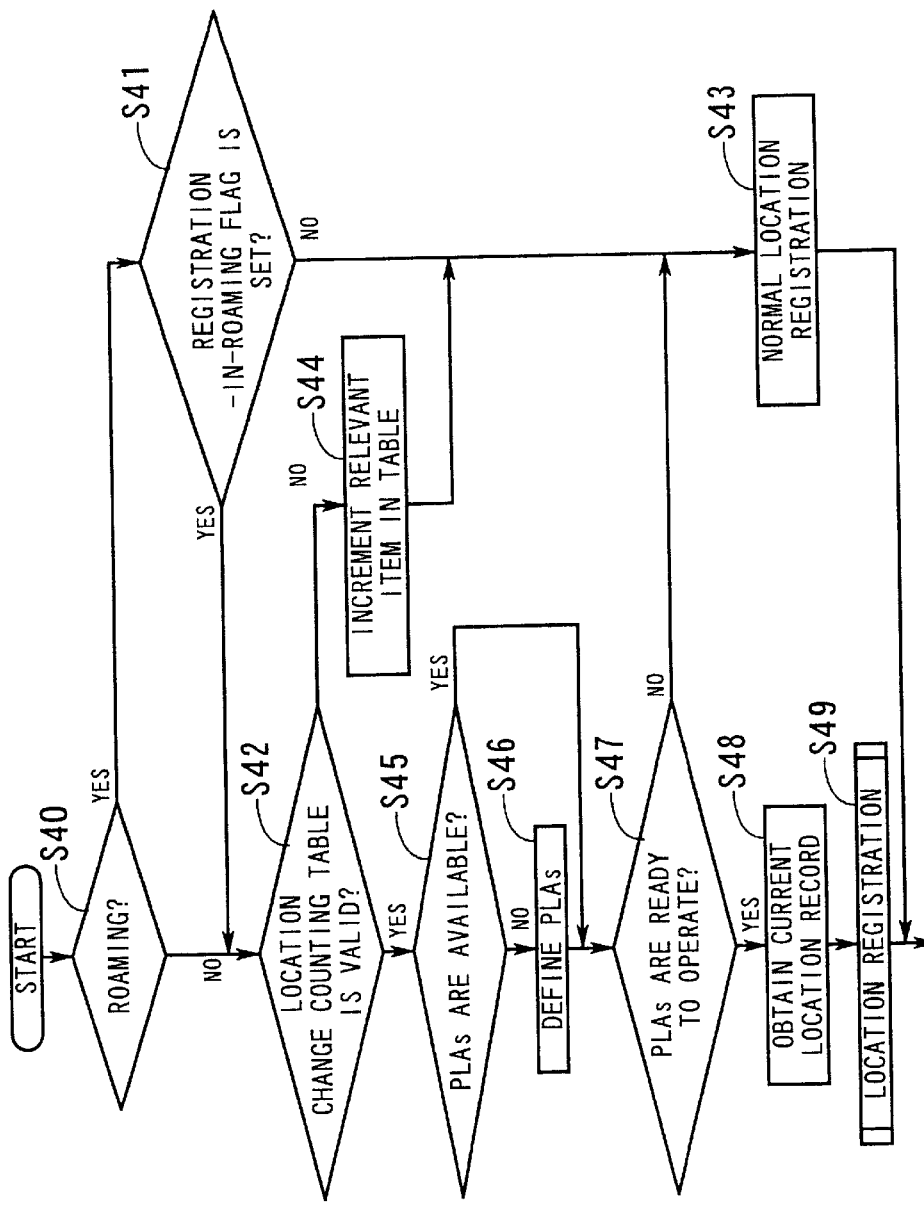
FIG. 10 is a flowchart which shows a typical process executed by the mobile station to register its location.

Referring now to a flowchart of FIG. 10, the following section will describe an example of a process whereby the mobile station 1 checks and registers its current location. This process will be executed, each time the base station ID extractor 1b detects a new base station ID, according to the following steps.

(S40) The second disabling unit 1k tests whether the mobile station 1 is currently roaming. If it is roaming, the process advances to step S41, and otherwise, the process proceeds to step S42. Here, the term "roaming" is used to mean such a situation where the mobile station 1 visits a remote cell that is far from its home location. To avoid possible accumulation of unnecessary data, the mobile station 1 may need to stop its internal process of setting personal location areas while it is in roaming mode. The second disabling unit 1k provides this option, examining notification messages from the serving base station to detect an in-roaming status.

(S41) The second disabling unit 1k tests whether the registration-in-roaming flag is set. If it is set, the process advances to step S42. Otherwise, the process proceeds to step S43. This registration-in-roaming flag is a single bit flag which can be set or reset by the user to specify whether to enable or disable the PLA setting unit 1d when the mobile station 1 is roaming. If this flag is set, it means that the user wishes the PLA setting function to work even in roaming mode.

(S42) The location change counting unit 1c determines whether its location change counting table is valid. If it is valid, the process advances to step S45, and otherwise, the process proceeds to step S44. The location change counting table is regarded as valid if, for example, it has collected data for at least one month.

(S43) The location registration unit 1g performs an ordinary location registration process, using a network default location area which is defined as a default location area inherent to the system.

(S44) The location change counting unit 1c adds one to a relevant item of the location change counting table.

(S45) The PLA setting unit 1d advances the process to step S47 if the personal location areas have already been defined. If not, then it executes step S46.

Figure 4:
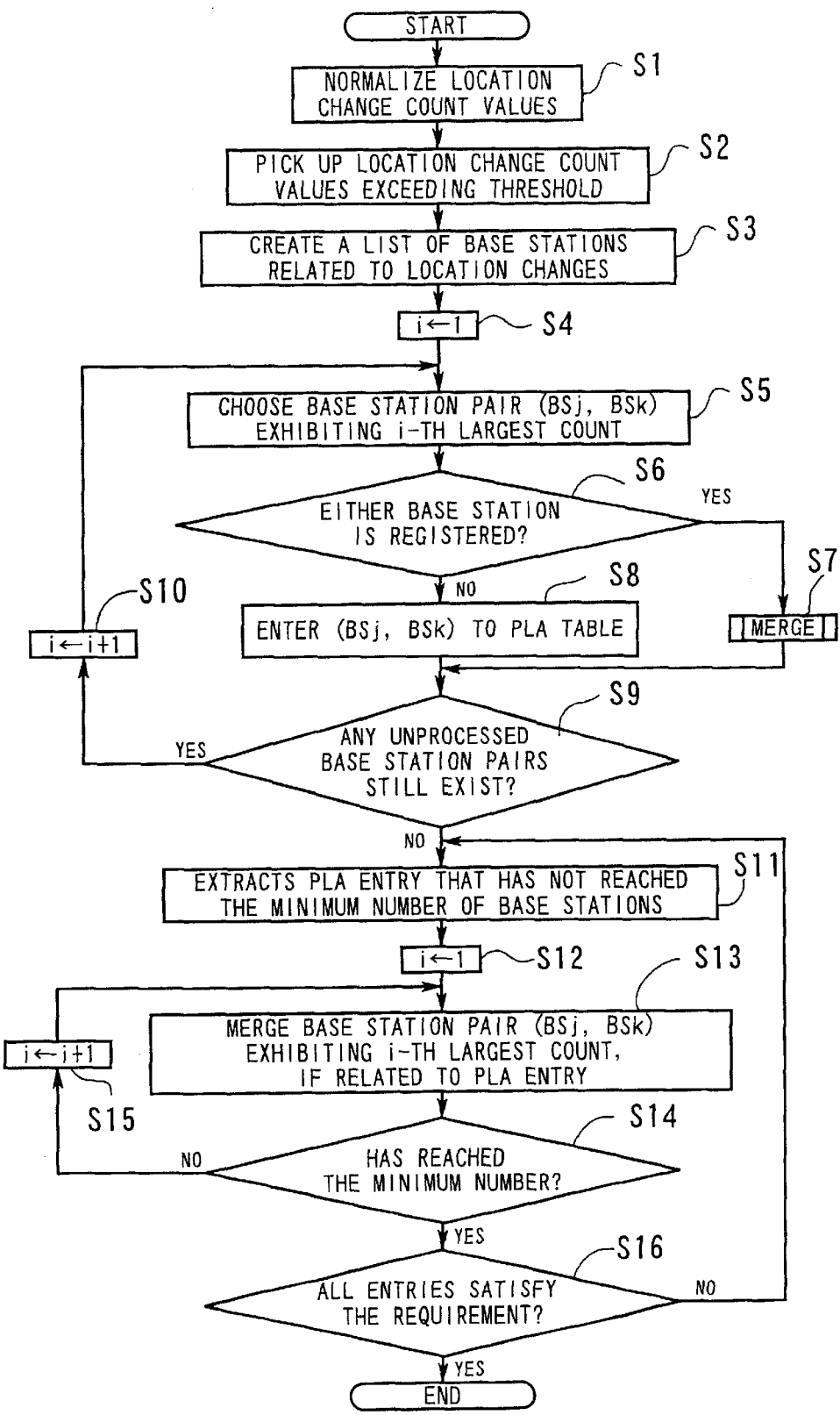
FIG. 4 is a flowchart which shows a typical process executed to define personal location areas in the system of FIG. 1.

(S46) The PLA setting unit 1d defines personal location areas, based on the location change counting table, according to the steps described in FIGS. 4 and 8.

(S47) The PLA setting unit 1d determines whether the personal location areas are ready to operate. If ready, the process advances to step S48, and otherwise, the process branches to step S43. More specifically, the process advances to step S48 if at least one personal location area is defined in the PLA table. If no personal location area is defined, the process goes to step S43.

(S48) The location registration unit 1g obtains a current location record of the mobile station 1 from an internal memory or register of the location registration unit 1g. What is obtained here as the "current location record" is actually an identifier which specifies either a personal location area or a network default location area provided by the system.

(S49) The location registration unit 1g exits from the present process after executing a "Location Registration" routine. The details of this routine will be described in the next paragraph with reference to FIG. 11.

Figure 11:
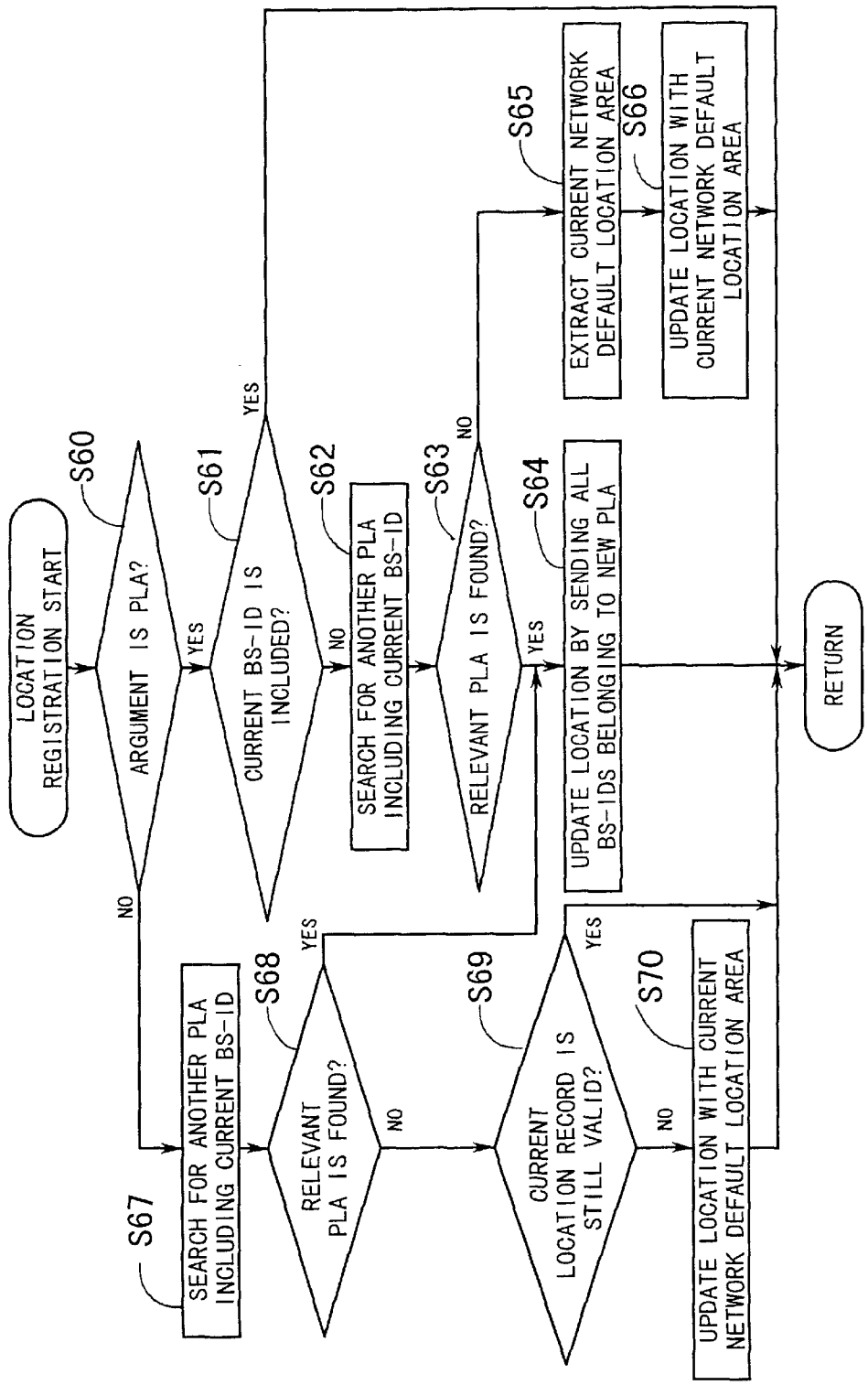
FIG. 11 is a flowchart which shows the details of a "LOCATION REGISTRATION" routine called at step S49 in the flowchart of FIG. 9.

FIG. 11 is a flowchart which shows the details of the "Location Registration" routine called at step S49. Note that the current location record is passed to this routine as its argument, or input parameter. The routine comprises the following steps.

(S60) The location registration unit 1g determines whether the given argument, i.e., current location record obtained at step S48 (FIG. 10), is a personal location area. If it is, the process advances to step S61, and otherwise, the process branches to step S67.

(S61) The location registration unit 1g determines whether the current base station ID (BS-ID) extracted by the base station ID extractor is found in the personal location area obtained at step S48 (FIG. 10). If the ID is found, then the control is returned to the calling process, without sending any location update messages. If not found, the process is directed to step S62 because it means that the mobile station 1 has left the personal location area that has so far been recognized as the current location.

(S62) The location registration unit 1g searches the PLA memory 1e for another personal location area that includes the present base station ID as a member.

(S63) If a relevant personal location area is found at step S62, the location registration unit 1g then proceeds to step S64 to update the location. If no relevant area is found, it goes to step S65.

Figure 12:
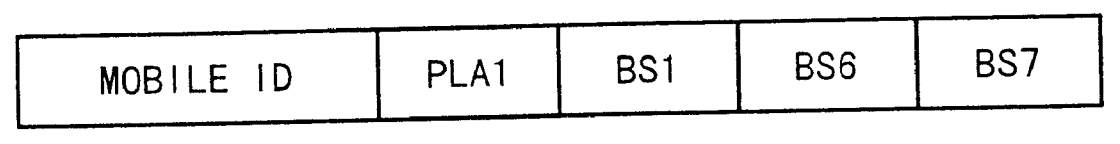
Figure 13:
FIG. 13 is a diagram showing another example of the location update message.
Figure 14:
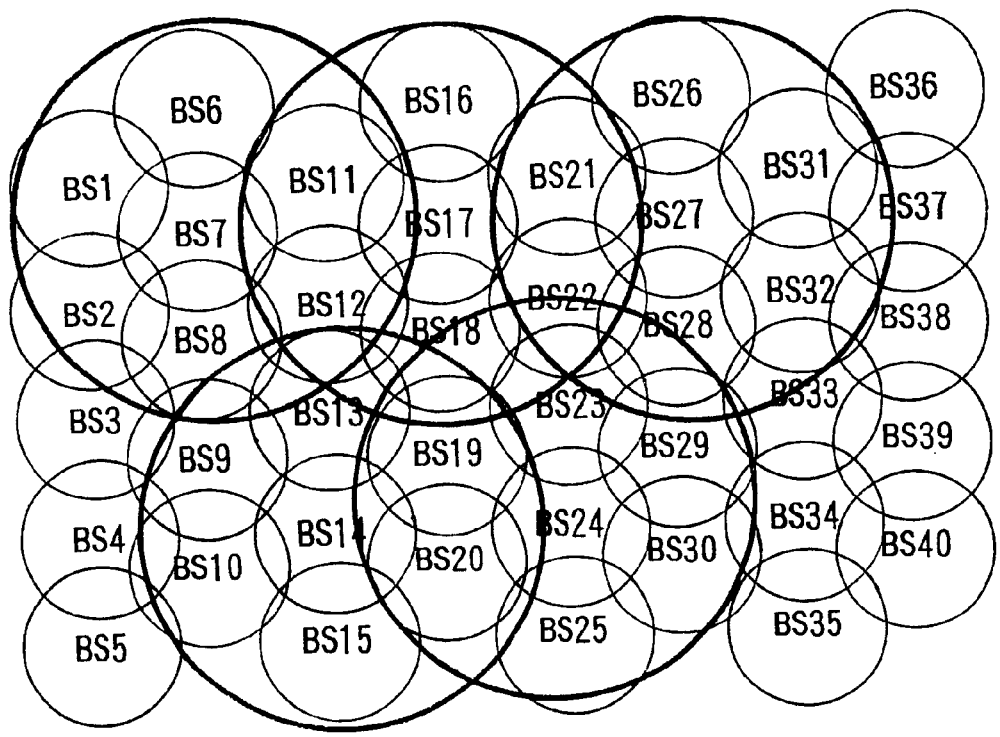
FIG. 14 is a diagram which explains the concept of location areas in a conventional mobile communications system.
Figure 15:
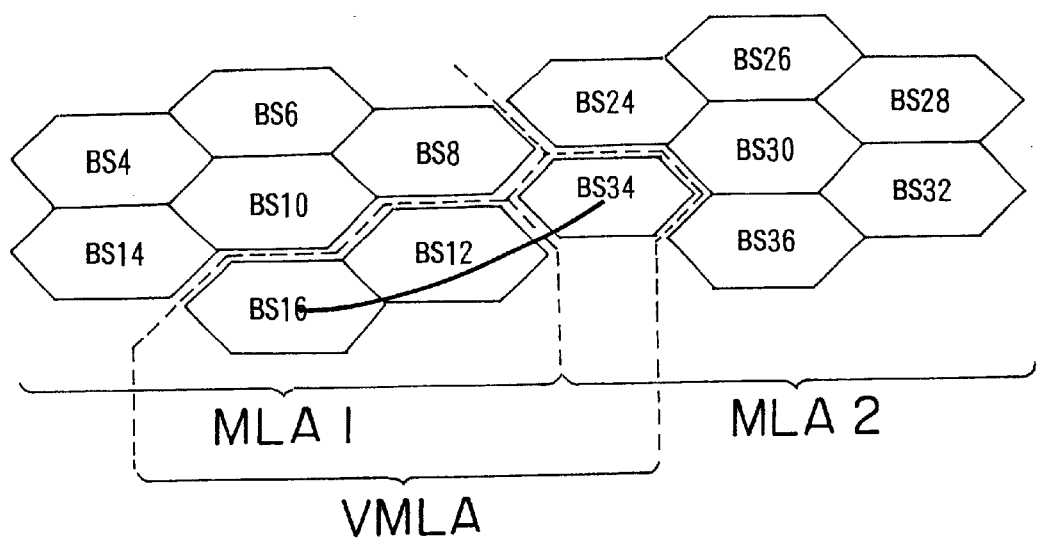
FIG. 15 is a diagram which shows typical location areas in a conventional mobile communications system.
Figure 16:
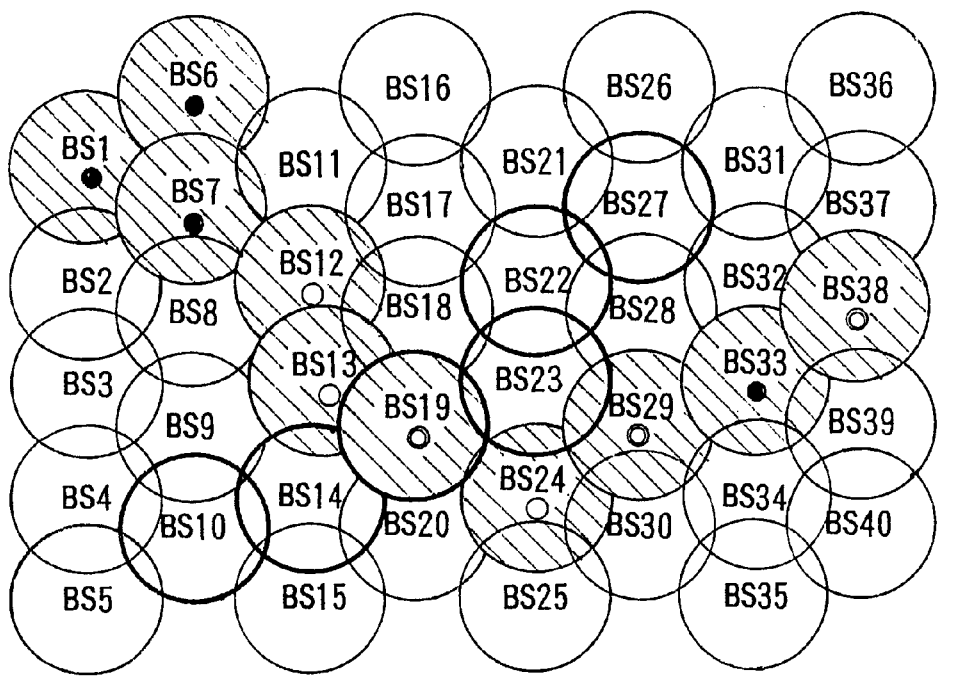
FIG. 16 is a diagram which shows another example of location areas in a conventional mobile communications system.

(S64) Searching the PLA memory 1e, the location registration unit 1g retrieves all base station IDs belonging to the new personal location area, and sends them to the mobile switching center 2 via the nearest base station, together with the identifier of the new personal location area itself. FIG. 12 shows an example of a location update message to be sent from the mobile station 1 to the mobile switching center 2, which comprises the following data items: (a) mobile identifier of the mobile station 1; (b) personal location area ID, i.e., the identifier of the newly selected personal location area; and (c) base station IDs indicating which cells constitute the area. If the same personal location area has been sent in the past, there is no need to send its base station IDs again. If this is the case, the location registration unit 1g can use an alternative message format shown in FIG. 13, eliminating base station ID fields. Upon receipt of those messages, the mobile switching center 2 extracts the new personal location area ID and its associated base station IDs (if available), so that the PLA configuration data memory 2a is updated with the new location information.

(S65) The location registration unit 1g extracts the current network default location area ID from the notification message that the mobile station 1 has received. Network default location areas are predefined groupings of cells provided by the system regardless of mobility patterns of individual subscribers. Each base station periodically sends its relevant area ID to mobile stations, using a data field of the notification message as explained earlier in FIG. 6.

(S66) The location registration unit 1g performs location registration by sending a location update message with the extracted network default location area ID, and then the control is returned to the calling process.

(S67) The location registration unit 1g searches the PLA memory 1e for a relevant personal location area which contains the current base station ID.

(S68) If a relevant personal location area is found at step S67, the location registration unit 1g then proceeds to step S64 to update the location. If no such area is found, it goes to step S69.

(S69) The location registration unit 1g determines whether the current location record agrees with the location area extracted from the latest notification message. If they agree with each other, then the control is returned to the calling process, without sending any location update messages. Otherwise, the process has to advance to step S70 because the current location record has turned out to be obsolete.

(S70) The location registration unit 1g performs location registration by sending a location update message with the network default location area ID extracted from the notification message, and the control is returned to the calling process.

As described above, the present invention permits location areas to be defined in accordance with the mobility pattern of each individual subscriber. This is accomplished by performing the following steps of: (a) recording location changes as location change count data for a predetermined period, (b) extracting, from the location change count data, such count values exceeding a predetermined threshold, and (c) defining personal location areas by merging adjacent cells associated with the extracted count values.

In the above-described embodiment, the location change counting table is formulated from event records that were collected during a continuous one-month period in order to define personal location areas. It is, however, not intended to limit the invention to this specific configuration, but an alternate idea described below is considered to fall within the scope of the present invention. That is, the time axis is divided into several appropriate periods, and location change events are counted separately for those periods, thereby yielding several location change counting tables. Personal location areas are then defined independently for each specific time period. This feature enables different sets of personal location areas to be used on weekdays and weekend, for instance. By introducing the concept of time segments as such, it becomes possible to provide personal location areas that precisely reflect the day-to-day mobility pattern of each individual subscriber.

While no particular access methods are mentioned so far, the present invention can be implemented, for example, in a code division multiple access (CDMA) network. The next paragraph will provides some notes which may be helpful when implementing the present invention in a narrowband-CDMA (N-CDMA) based system. The specifications of N-CDMA are available as the CDMA mobile telephone system standard, STD-T53 version 1.0, from the Association of Radio Industries and Businesses (ARIB).

When the present invention is applied to N-CDMA systems, system parameter messages can serve as the notification messages since they contain a base station ID (BASE-ID). This BASE-ID allows each base station to be uniquely identified within a network if it is supported by a single network service provider. However, in a heterogeneous environment where the network consists of a plurality of sub-networks of different providers, it will be necessary to use more identifiers, such as network IDs (NIDs) and system IDs (SIDs), in combination with the base station IDs (BASE-IDs).

Further, it is possible to implement the location registration messages by using "Registration Messages," which are originally defined for the purpose of registering access channels. More specifically, the personal location area ID and base station IDs (FIG. 12 or 13) can be sent to the mobile switching center 2, being added to a registration message.

The above discussion is now summarized as follows. According to the present invention, each mobile station comprises: a notification message receiver, a base station ID extractor, a location change counting unit, a PLA setting unit, a PLA memory, a location change detector, and a location registration unit, The notification message receiver receives a notification message from the nearest base station, and from this message, the base station ID extractor extracts a base station ID to identify in which cell the mobile station is currently located. The location change counting unit detects a change in the mobile location by comparing two consecutive instances of the base station ID, and it counts and records such location changes, together with the two base station IDs involved in each change. Based on those location change count values, the PLA setting unit defines personal location a areas by grouping associated cells into one area. The PLA memory stores the defined personal location areas and relevant base station IDs. Each time a new base station ID is detected, the location change detector tests whether the presently registered personal location area is still valid. If it is no longer valid, the location registration unit searches the PLA memory for a new relevant personal location area. The location registration unit then sends a location updating message to notify the mobile switching center of the new personal location area and its relevant base station IDs. The mobile switching center accepts the location registration from mobile stations. That is, its PLA configuration data memory stores the content of each received location updating message. The mobile switching center further comprises a paging unit, which uses the PLA configuration data memory to page a specific mobile station through a group of base stations belonging to the current personal location area of the mobile station.

The mobile communications system configured as above will provide for an advantageous mechanism to reduce the control message traffic effectively in paging and location updating operations. This arrangement also permits mobile stations to be paged promptly, without wasting time or bandwidth.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile communications system where base stations provide radio links for mobile stations in each cell and a mobile switching center controls connections between the mobile stations by switching circuits, the system comprising:

notification message reception means, disposed in each mobile station, for receiving a notification message from the nearest base station;

base station ID extracting means, disposed in each mobile station, for extracting a base station ID from the received notification message to identify which base station is sending the notification message;

location change counting means, disposed in each mobile station, for detecting location changes by comparing two consecutive instances of the base station IDs extracted by said base station ID extracting means, and counting the detected location changes separately for each pair of base station IDs involved in the changes;

personal location area (PLA) setting means, disposed in each mobile station, for defining personal location areas by grouping associated cells into one area, based on the location change count values obtained by said location change counting means; .

PLA memory means, disposed in each mobile station, for storing records of the personal location areas defined by said PLA setting means, each of the records containing the base station IDs indicating which cells constitute each personal location area;

location change detecting means, disposed in each mobile station, for testing whether the personal location area registered at present is valid, each time said base station ID extracting means extracts a base station ID that is different from before;

location registration means, disposed in each mobile station and activated when said location change detecting means has detected that the registered personal location area is no longer valid, for searching said PLA memory means to retrieve one of the records of personal location areas that contains the extracted base station ID, and performing location registration by sending to the mobile switching center the retrieved personal location area and base station IDs relevant thereto;

PLA configuration data storage means, disposed in the mobile switching center, for storing records of the personal location area and relevant base station IDs received from each mobile station; and paging means, disposed in the mobile switching center and responsive to an incoming call to one of the mobile stations, for searching said PLA configuration data storage means to retrieve one of the records that is relevant to the called mobile station, and paging the called mobile station through the base stations specified in the retrieved record.

2. The mobile communications system according to claim 1, wherein said personal location area setting means extracts such mobile station ID pairs that exhibit larger location change count values exceeding a predetermined threshold, and defining the personal location areas by grouping the mobile station ID pairs having a predetermined relationship.

3. The mobile communications system according to claim 1, wherein said location registration means performs location registration by using network default location areas that the system provides, if no relevant personal location area is found in said PLA memory means.

4. The mobile communications system according to claim 1, wherein:

each of the mobile stations comprises real-time clock means for providing date and time information, and said PLA setting means refers to the date and time information provided by said real-time clock means to update the definitions of the personal location areas at predetermined intervals.

5. The mobile communications system according to claim 1, wherein:

said mobile switching center further comprises minimum/maximum number notification means for notifying the mobile stations of parameters specifying suitable size of each personal location area, the parameters including minimum and maximum numbers of cells to be grouped into one personal location area; and said PLA setting means uses the minimum and maximum numbers of cells to define the personal location areas.

6. The mobile communications system according to claim 5, wherein:

said mobile switching means further comprises incoming call frequency memory means for counting incoming calls addressed to each individual mobile station; and said minimum/maximum number notification means modifies the minimum and maximum numbers, referring to the count values provided by said incoming call frequency memory means, in such a way that the minimum number or maximum number for frequently-called mobile stations will be reduced by a predetermined number, while the minimum number or maximum number for infrequently-called mobile stations will be increased by another predetermined number.

7. The mobile communications system according to claim 5, wherein:

each of the mobile stations further comprises incoming call frequency memory means for counting incoming calls addressed thereto; and said PLA setting means modifies minimum and maximum numbers of cells to be grouped, referring to count records provided by said incoming call frequency memory means, in such a way that the minimum number or maximum number for frequently-called mobile stations will be reduced by a predetermined number, while the minimum number or maximum number for infrequently-called mobile stations will be increased by another predetermined number.

8. The mobile communications system according to claim 1, wherein each of the mobile stations further comprises disabling means for disabling said location change counting means and said PLA setting means.

9. The mobile communications system according to claim 8, wherein each of the mobile stations further comprises overriding means for temporarily overriding said disabling means to make said location change counting means and said PLA setting means operate, and if a different personal location area is obtained during the temporary overriding, continuing to override said disabling means for a predetermined extended period.

10. The mobile communications system according to claim 1, wherein each of the mobile stations further comprises disabling means for disabling said location change counting means and said PLA setting means when said each mobile station is roaming.

11. The mobile communications system according to claim 1, wherein the mobile stations communicate with the mobile switching center by using CDMA techniques.

12. A mobile station for use in a mobile communications system where base stations provide radio links for mobile subscribers in each cell and a mobile switching center controls connections between the mobile subscribers by switching circuits, the mobile station comprising:

notification message reception means for receiving a notification message from the nearest base station;

base station ID extracting means for extracting a base station ID from the received notification message to identify which base station is sending the notification message;

location change counting means for detecting location changes by comparing two consecutive instances of the base station IDs extracted by said base station ID extracting means, and counting the detected location changes separately for each pair of base station IDs involved in the changes;

personal location area (PLA) setting means, disposed in each mobile station, for defining personal location areas by grouping associated cells into one area, based on the location change count values obtained by said location change counting means;

PLA memory means, disposed in each mobile station, for storing records of the personal location areas defined by said PLA setting means, each of the records containing the base station IDs indicating which cells constitute each personal location area;

location change detecting means for testing whether the personal location area registered at present is valid, each time said base station ID extracting means extracts a base station ID that is different from before; and location registration means, disposed in each mobile station and activated when said location change detecting means has detected that the registered personal location area is no longer valid, for searching said PLA memory means to retrieve one of the records of personal location areas that contains the extracted base station ID, and performing location registration by sending to the mobile switching center the retrieved personal location area and base station IDs relevant thereto.

* * * * *